Sept. 20, 1966　　　T. H. HANSSON　　　3,273,849
APPARATUS FOR CONTROLLING THE MOISTURE CONTENT
IN LIQUID-ABSORBING SUBSTANCES
Filed April 29, 1963　　　　　　　2 Sheets-Sheet 1
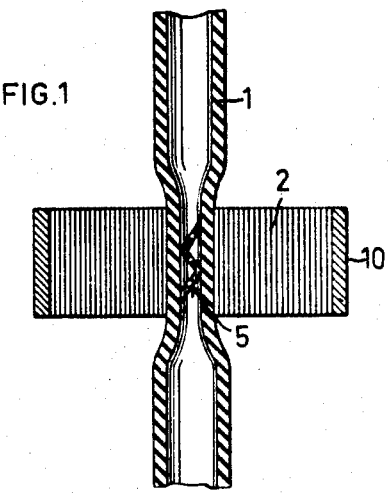
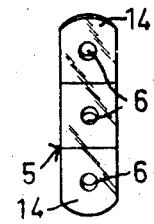
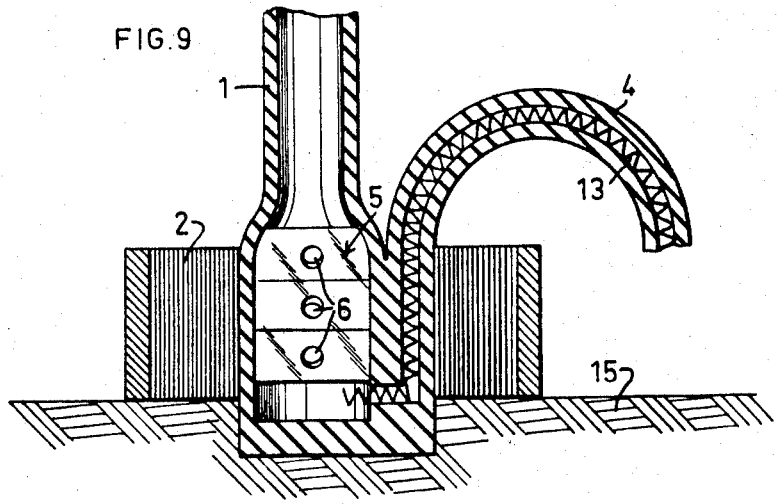

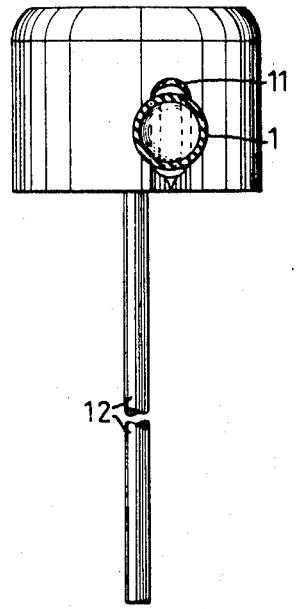
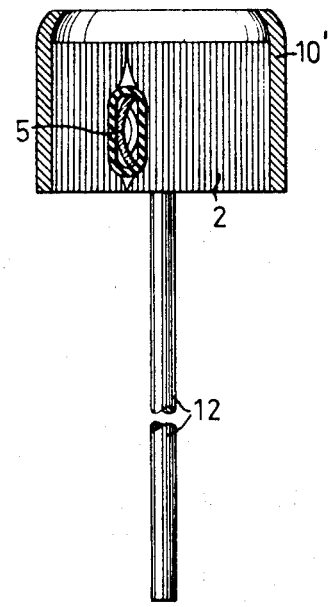
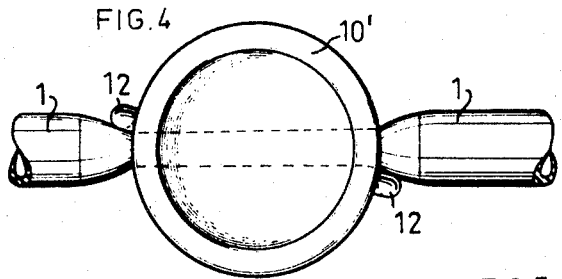
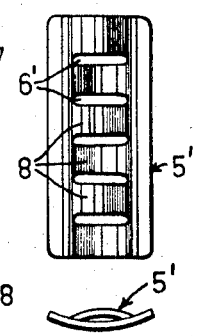

United States Patent Office 3,273,849
Patented Sept. 20, 1966

3,273,849
APPARATUS FOR CONTROLLING THE MOISTURE CONTENT IN LIQUID-ABSORBING SUBSTANCES
Thure Henning Hansson, Ernst Ahlgrensgatan 2B, Malmo, Sweden
Filed Apr. 29, 1963, Ser. No. 276,493
11 Claims. (Cl. 251—4)

This invention relates to an apparatus which is adapted, for the control of the moisture content in liquid-absorbing substances, to regulate the supply of liquid through an elastic liquid supply conduit to said substance by a medium which expands upon absorption of liquid. In accordance with the invention, the medium which expands upon absorption of liquid is disposed around the elastic conduit and in contact with the substance the moisture of which is to be regulated. When the liquid-absorbing substance is moist the medium expands by absorption of liquid from the substance and compresses the liquid supply conduit, thus preventing flow of liquid therein and consequently interrupting the liquid supply to the substance. When the liquid-absorbing substance dries owing to the interrupted flow of liquid in the liquid supply conduit the medium which expands upon absorption of liquid also dries and shrinks so that the elastic liquid supply conduit can return to its original shape and allow liquid to pass through the conduit. The supply of water for example to the earth in flowerpots or to the soil at other localities can thereby be controlled in a simple manner.

These and further features of the invention will become apparent from the following description of some embodiments of the invention, reference being made to the accompanying drawings, in which:

FIG. 1 is a longitudinal sectional view of an embodiment of the apparatus according to the invention;

FIG. 2 is a longitudinal sectional view of another embodiment of the apparatus;

FIG. 3 is a side elevational view of the embodiment shown in FIG. 2;

FIG. 4 is a plan view of the embodiment shown in FIG. 2;

FIGS. 5 and 6 are a front and a side elevational view, respectively, of a detail of the apparatus;

FIGS. 7 and 8 are a front elevational view and an end view, respectively, of another design of the detail shown in FIGS. 5 and 6;

FIG. 9 is a longitudinal sectional view of a further embodiment of the apparatus.

The embodiments of the apparatus according to the invention, shown in the accompanying drawing, are equipped with a liquid supply conduit or hose 1 of elastic material. Disposed around the conduit 1 is a medium 2 which expands upon liquid absorption and which at the use of the apparatus is kept in contact with the substance the moisture of which is to be controlled. The medium 2 is composed of vegetable fibres, such as flax, cotton or hemp fibres, which are arranged with their longitudinal axes largely in parallel with each other. In the embodiment shown in FIG. 1 the fibres have their longitudinal axes oriented in the direction of the longitudinal axis of the resilient conduit 1 extending through the medium, and mainly in parallel with said longitudinal axis. In the embodiment shown in FIGS. 2–4 the fibres have their longitudinal axes oriented in the transverse direction of the elastic conduit 1 extending through the medium 2, and mainly at right angles to the longitudinal axis of said conduit 1. In the embodiment shown in FIG. 9 the outlet end 4 of the conduit 1 is passed back through the medium 2 so that the outlet end 4 opens on that side of the apparatus where the conduit 1 enters the apparatus.

To ensure a satisfactory interruption of the liquid supply through the conduit 1, in that part of said conduit which is passed through the medium 2 there is arranged in the interior of the liquid supply conduit 1 in said portion thereof which is surrounded by the medium which expands upon liquid absorption, a plate-shaped insert 5 of a larger extension in the transverse direction of the conduit 1 than the diameter of said conduit. This insert 5 makes the cross section of the conduit 1 more elongated and ensures a more efficient effect of the medium on the conduit or hose. The insert 5 is elongated, provided with holes 6 and so disposed that the longitudinal axis of said insert 5 coincides with the longitudinal axis of the conduit 1. Moreover, the insert 5 is wave-shaped so that the waves extend either transversely of the insert 5 (FIGS. 5 and 6) or longitudinally of said insert 5′ (FIGS. 7 and 8). The holes 6 of the insert 5 are provided in the portions 7 of the insert which are situated between the wave crests (FIGS. 5 and 6). The waves spaced longitudinally of the insert 5′ (FIGS. 7 and 8) are provided in the insert portions 8 between the elongated holes 6′ (FIG. 7) and these holes 6′ extend transversely of the insert.

The fibres of the medium 2 are preferably impregnated with substances preventing the formation of mould on the fibres. Furthermore, the surface of the medium which is to bear against the liquid-absorbing substance is coated with an ion exchange material.

The fibres of the medium 2 are held together by means of a ring 10 for example of metal, in which the fibres are disposed with their longitudinal axes parallel to the axis of the ring 10. In the embodiment shown in FIGS. 2–4 the ring 10′ has two opposed notches 11 for the conduit 1 passed through the ring 10′. Furthermore, one edge of the ring 10′ which is to bear against the liquid absorbing substance is provided with anchoring means 12 preferably in the form of feelers to hold the device in place. In the conduit outlet end 4 which is bent back upon itself, and at least in the portion of said end which is returned through the medium 2 there is disposed an element 13, preferably in the form of a coil spring which keeps the conduit walls in said end spaced apart and prevents the conduit from being compressed over this length when the medium 2 expands, and this will always ensure that liquid is able to flow through the outlet end 4 of the conduit 1. The insert 5 shown in FIGS. 5 and 6, in addition to the waves extending transversely of the insert, has waves 14 which extend longitudinally of said insert at the ends thereof to spread the conduit walls apart.

The conduit 1 has one end connected to a liquid source (not shown) and the other end of the conduit is pushed down into or lies on top of the liquid-absorbing substance the moisture content of which is to be controlled, for example the earth 15 (FIG. 9) of a flowerpot so that the downwardly facing surface of the medium 2 is in contact with the earth of the flowerpot. As long as the portion of the conduit 1 which extends through the medium 2 is open water flows through the lower end of the conduit into the earth which is gradually moistened throughout. Upon thorough moistening of the earth the medium 2 absorbs water from the earth by means of its surface contacting it and finally expands to such an extent that the portion of the conduit 1 passing through the medium 2 is compressed and prevents flow of liquid through the conduit and subsequent supply of liquid to the earth of the flowerpot. The holes 6 in the insert 5 disposed in the conduit 1 allow water to pass through the conduit 1 when the latter is not compressed by the medium 2 but as soon as the medium 2 expands by absorption of moisture the conduit 1 is compressed so that the holes 6 are closed by the walls of the conduit. Upon compression the conduit 1 is pressed by the medium 2 into the wave-troughs and thus into the spaces between the perforated portion of the insert 5 under a certain straightening of said insert, thus closing the holes 6 therein.

The apparatus functions in a fully satisfactory manner also in the absence of the insert 5 because the medium 2 upon expansion is fully capable of compressing the elastic conduit 1 and to interrupt the liquid supply through said conduit. Upon use of the apparatus over a longer time there is, however, obtained a more reliable effect with an insert 5 which by its wave-shape divides the portion of the conduit 1 which is passed through the medium 2 into a number of valves corresponding to the number of waves and essentially improving the function of the apparatus by their series connection.

The above embodiments of the invention were described for purposes of illustration rather than limitation. All possible variations and modifications of the invention are understood as being included within the scope of the appended claims.

What I claim and desire to secure by Letters Patent is:

1. A moisture responsive valve comprising an elastic fluid conduit, expansible means adjacent to a substantial portion of said conduit and being expandable upon absorption of liquid, means to limit the expansion forces substantially to those effecting collapse of said conduit, whereby absorption of liquid by said expansible means effects collapse of said conduit and arrests fluid flow therethrough.

2. An apparatus as set forth in claim 1 wherein said expansible means comprises vegetable fibres having their longitudinal axes substantially parallel with each other.

3. An apparatus as set forth in claim 2 wherein said fibres have their longitudinal axes substantially oriented in the direction of the longitudinal axis of said conduit passing through said fibres.

4. An apparatus set forth in claim 2, wherein said fibres have their longitudinal axes substantially oriented in the direction transverse and at right angles to said conduit extending through said fibres.

5. An apparatus as claimed in claim 2 wherein said fibres are impregnated with a substance preventing the formation of mould on the fibres.

6. An apparatus as claimed in claim 1, wherein the outlet end of said conduit is passed back through said expansible means so that said outlet end opens on the same side of said valve as said conduit enters expansible means.

7. An apparatus as set forth in claim 1 further comprising a plate-shaped insert having a larger dimension transversely of the conduit than the diameter of said conduit, said insert being disposed within said conduit at the location of said expansible means.

8. An apparatus as claimed in claim 7, wherein said insert is elongated, provided with holes and so disposed that the longitudinal axis of the insert coincides with the longitudinal axis of the conduit.

9. An apparatus as claimed in claim 8, wherein said insert is wave-shaped.

10. An apparatus as claimed in claim 1, wherein a portion of said expansible means is coated with an ion exchange material.

11. An apparatus as claimed in claim 1, wherein said means to limit expansion comprises a metal ring having two opposed notches for said conduit to pass therethrough, one edge of said ring being adapted to bear against the substance the moisture content of which is to be controlled, and anchoring means provided on said ring.

References Cited by the Examiner
UNITED STATES PATENTS

| | | | |
|---|---|---|---|
| 2,633,131 | 3/1953 | Grosvenor | 137—78 X |
| 3,017,903 | 1/1962 | Steffens | 251—5 X |

WILLIAM F. O'DEA, *Primary Examiner.*

R. GERARD, *Assistant Examiner.*

ISADOR WEIL, *Examiner.*